United States Patent
Guo et al.

(10) Patent No.: US 9,967,266 B2
(45) Date of Patent: May 8, 2018

(54) PRE-FILTERING DIGITAL CONTENT IN A DIGITAL CONTENT SYSTEM

(71) Applicant: Flipboard, Inc., Palo Alto, CA (US)

(72) Inventors: Meng Guo, San Jose, CA (US); David Zachary Creemer, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 41 days.

(21) Appl. No.: 14/935,770

(22) Filed: Nov. 9, 2015

(65) Prior Publication Data

US 2017/0134406 A1    May 11, 2017

(51) Int. Cl.
| | |
|---|---|
| *H04L 29/06* | (2006.01) |
| *G06F 21/55* | (2013.01) |
| *G06T 7/40* | (2017.01) |

(52) U.S. Cl.
CPC .......... *H04L 63/1416* (2013.01); *H04L 63/12* (2013.01); *H04L 63/1441* (2013.01); *H04L 63/18* (2013.01)

(58) Field of Classification Search
CPC .......... G06F 21/16; G06F 21/57; G06F 21/56; H04L 9/3247; H04L 29/06578; H04L 63/20; H04L 63/0227; H04L 29/06877; H04L 2/06986; H04L 63/0254; H04L 29/06619; H04L 9/32; H04L 63/14; H04L 63/12; H04L 9/06; H04L 63/1416; H04L 63/1441; H04L 63/18; H04L 29/06986
USPC ....................... 726/1, 26; 382/165
See application file for complete search history.

(56) References Cited

U.S. PATENT DOCUMENTS

| | | | |
|---|---|---|---|
| 6,895,111 B1 | 5/2005 | Swift | |
| 8,478,052 B1 | 7/2013 | Yee et al. | |
| 8,787,683 B1 | 7/2014 | Yee et al. | |
| 8,788,442 B1 | 7/2014 | Sculley, II et al. | |
| 9,380,356 B2 * | 6/2016 | McMillan | H04N 21/8352 |
| 9,418,310 B1 | 8/2016 | Chen et al. | |
| 9,471,851 B1 | 10/2016 | Cao et al. | |

(Continued)

FOREIGN PATENT DOCUMENTS

| | | | | | |
|---|---|---|---|---|---|
| CN | 101923652 B | * | 5/2012 | ............... | G06K 9/66 |
| KR | 20100030300 A | * | 3/2010 | ............... | G06T 7/40 |

OTHER PUBLICATIONS

"Architecture Research and Design for the Internet Content Rating Implementation System," Y. Liu, G. Zhao, T. Wang and Y. Liu, 2010 Second International Workshop on Education Technology and Computer Science, Wuhan, 2010, pp. 396-401.*

*Primary Examiner* — Theodore C. Parsons
*Assistant Examiner* — Sameera Wickramasuriya
(74) *Attorney, Agent, or Firm* — Fenwick & West LLP

(57) ABSTRACT

A digital content system enables users of the content system to access, view and interact with digital content items in a safe, efficient and enjoyable online environment. The content system pre-filters an image content item and determines whether the content item is suspicious of having unsafe content, e.g., nudity and pornography. For example, the content system pre-filters an image content item based on the source of the image content item. A content item from a source known for providing safe content is determined to be safe. The content system determines an image content item to be safe if the content item matches a content item known to be safe or if the content item contains less than a threshold amount of human skin. The content system may further verify the content of the image content item with a verification service and takes remedial actions based on the verification result.

14 Claims, 5 Drawing Sheets

(56) References Cited

U.S. PATENT DOCUMENTS

| | | | |
|---|---|---|---|
| 2002/0159630 A1* | 10/2002 | Buzuloiu | G06T 15/00 382/154 |
| 2003/0004966 A1 | 1/2003 | Bolle et al. | |
| 2008/0002893 A1 | 1/2008 | Vincent et al. | |
| 2008/0002916 A1 | 1/2008 | Vincent et al. | |
| 2008/0172412 A1 | 7/2008 | Gruhl et al. | |
| 2008/0219495 A1* | 9/2008 | Hulten | G06F 17/30247 382/100 |
| 2009/0064323 A1 | 3/2009 | Lin | |
| 2009/0123064 A1* | 5/2009 | Gibbs | G06K 9/00362 382/165 |
| 2009/0232413 A1* | 9/2009 | Songhurst | G06F 21/6218 382/275 |
| 2011/0047388 A1* | 2/2011 | Park | G06F 21/6209 713/189 |
| 2011/0142346 A1 | 6/2011 | Han et al. | |
| 2011/0150328 A1 | 6/2011 | Han et al. | |
| 2014/0198982 A1* | 7/2014 | Dinerstein | G06K 9/00234 382/165 |
| 2015/0023552 A1* | 1/2015 | Rosen | G06K 9/00362 382/103 |
| 2015/0125074 A1* | 5/2015 | Yu | G06T 7/408 382/164 |
| 2015/0221097 A1* | 8/2015 | Yu | G06T 7/408 382/165 |
| 2015/0317325 A1* | 11/2015 | Key | G06F 17/30864 707/770 |
| 2015/0319138 A1* | 11/2015 | Yan | H04L 63/145 726/11 |
| 2016/0012213 A1* | 1/2016 | Walsh | G06F 21/128 726/27 |
| 2016/0350675 A1 | 12/2016 | Laks et al. | |

* cited by examiner

PRE-FILTERING DIGITAL CONTENT IN A DIGITAL CONTENT SYSTEM

BACKGROUND

This disclosure relates generally to online content systems, and more specifically to pre-filtering image content items to detect content that violates a content policy of a digital content system.

Digital distribution channels disseminate a wide variety of digital content including text, images, audio, links, videos, and interactive media (e.g., games, collaborative content) to users. Users often interact with content items in a content system, e.g., a digital magazine, provided by various sources, such as social networking systems, online publishers and blogs. However, some of the content items curated and displayed by a content system may be considered illegal or inappropriate for viewing in a working or professional environment or by a particular group of viewers such as young viewers under certain age. Images and/or text that contain nudity/pornography, child pornography, offensive language or profanity are commonly considered to be not safe or appropriate for users in a content system.

Detecting digital content that violates a policy of a content system such as images of child pornography can be computationally expensive. For example, some existing solutions rely on computationally expensive verification services, e.g., MICROSOFT™ PHOTODNA® service, which computes a hash that uniquely identifies an image and compares the computed hash with reference hashes for detection. Additionally, verifying image content for particular types of content requires a large amount of network bandwidth to upload the image content to the verification service, which can clog network traffic of a content system. An effective digital content management system requires the ability to efficiently identify inappropriate content and to take remedial actions on the identified content.

SUMMARY

A digital content system, e.g., a digital magazine system, enables users of the content system to access, view and interact with digital content items in a safe, efficient and enjoyable online environment. The content system pre-filters a content item that has one or more digital images and determines whether the content item is suspicious of having unsafe content, e.g., nudity and pornography. For example, the content system pre-filters an image content item based on one or more criteria. In one embodiment, the content system determines whether a content item is safe to consume based on the source of the content item. A content item from a source known for providing safe content, e.g., CNN® or National Geography, is determined to be safe. In another embodiment, the content system determines an image content item to be safe if the content item matches a content item known to be safe.

In yet another embodiment, the content system determines that a content item is safe if the content item contains less than a threshold amount of human skin. The content system analyzes the pixels representing the image signals of the content item and classifies the pixels as skin pixels and non-skin pixels. A skin pixel has a color within a predefined range that is consistent with human skin tones. The content system calculates the total number of skin pixels in identified connected regions in the digital image and compares the total number of skin pixels with a predetermined threshold value, e.g., a maximum number of skin pixels in a connected region, and determines whether the content item has unsafe content based on the comparison. More advanced heuristics, such as skin tone range detection, skin tone location, skin pixel, and connected skin regions are also utilized, in combination with determining whether the image depicts a human being and not a non-human object.

The content system may further verify the content of the image content item with a verification service and takes remedial actions based on the verification result. For example, the content system may verify a content item that is suspicious of having nudity content with a third-party verification service, e.g., PHOTODNA®. The content system can provide a URL of the suspicious content item or a pre-calculated bit string representation (e.g., a base64 string representation) of the suspicious content item, to the third-party verification service. Sending a pre-calculated bit string representation of a suspicious content item prevents important usage information associated with the suspicious content item from exposing to a third-party service and helps reduce service roundtrip time. If the verification result indicates that the content item indeed has nudity content, the content system can prevent the content item from being further distributed to other users of the content system.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

A digital content system enables users to access, view and interact with digital content items in a safe, efficient and enjoyable online environment provided by the digital content system. One example of the digital content system is a digital magazine system that selects content items from various sources for presentation to a user based on the user's interests and preferences. The content items are sent with instructions for display to the user on a client device of the user. The generated digital magazine is retrieved by a digital magazine application executing on the client device and presented to the user. The generated digital magazine allows the user to more easily consume content by presenting content items in an easily navigable interface via the client device. A "content item" or "article" herein refers to any machine-readable and machine-storable work product, such as pictures/images, textual articles, videos, user-generated content (e.g., content posted on a social networking system), advertisements, and any other types of digital content capable of display within the context of a content system. An "image content item" is an image or a content item that contains at least one image. A content item that contains offensive language, profanity, nudity/pornography or any other inappropriate content herein is referred to as "unsafe content."

Figure 1:
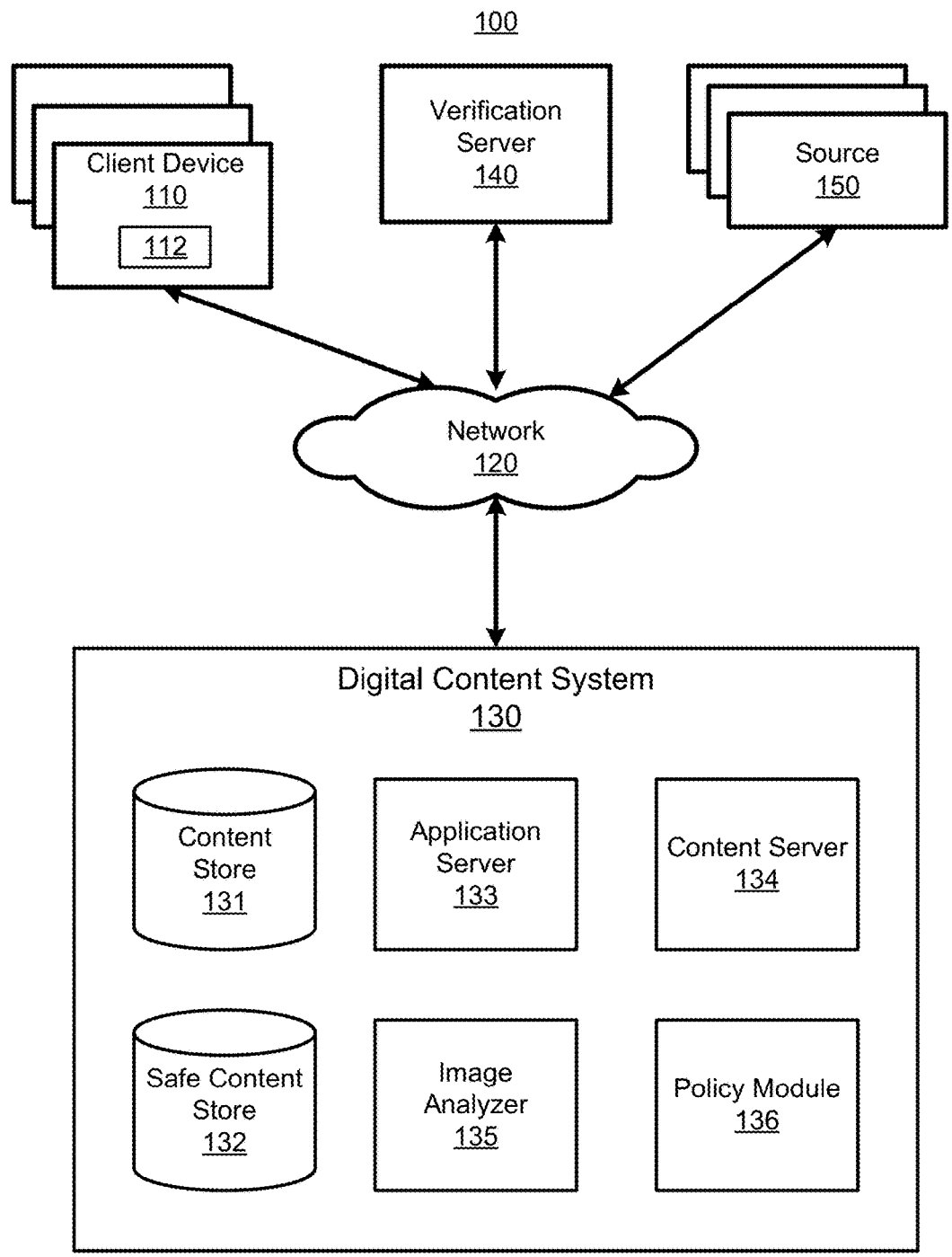
FIG. 1 is a block diagram of a system environment in which a digital content system identifies image content items that are suspicious of containing unsafe content according to one embodiment.

FIG. 1 is a block diagram of a system environment 100 in which a digital content system 130 identifies image content items that are suspicious of containing unsafe content according to one embodiment. The system environment 100 shown in FIG. 1 includes one or more client devices 110, a network 120, the digital content system 130, a verification server 140 and one or more sources 150. In alternative configurations, different and/or additional components, e.g., a web server, may be included in the system environment 100. The embodiments described herein can be adapted to digital content systems that are not digital magazine systems.

The client device 110 is a computing device capable of receiving user input as well as transmitting and/or receiving data via the network 120. Various embodiments of the client device 110 include a conventional computer system, such as a desktop or a laptop computer, and a device having computer functionality, such as a personal digital assistant (PDA), a mobile telephone, a smartphone or another suitable device. In one embodiment, the client device 110 executes a digital magazine application 112 allowing a user of the client device 110 to interact with the digital content system 130. For example, the digital magazine application 112 executing on the client device 110 communicates instructions or requests for content items to the digital content system 130. The client device 110 also executes a browser that receives pages from the digital content system 130 and presents the pages to a user of the client device 110. In another embodiment, the client device 110 interacts with the digital content system 130 through an application programming interface (API) running on a native operating system of the client device 110, such as IOS® or ANDROID™.

The client device 110 communicates with the digital content system 130 via the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The verification server 140 is a computer server that verifies whether a digital image contains unsafe content. In one embodiment, the verification server 140 is a third-party verification service, e.g., MICROSOFT™ PHOTODNA® service. Using PHOTODNA® type of verification technology, for an image to be verified, the verification server 140 computes a unique digital signature of the image or a pre-calculated bit string representation (e.g., a base64 string representation) of the image, e.g., by computing a hash value of the image, and compares the digital signature of the image with reference signatures that are known to contain unsafe content, e.g., nudity. In one embodiment, the hash of an image is computed such that the hash is resistant to alterations in the image such as resizing and minor color alterations. The verification server 140 provides the verification result of the image to the digital content system 130 for further processing.

In other embodiments, the verification server 140 can be a part of the digital content system 130 and uses other image verification technologies, e.g., trained image content classifiers such as Naïve-Bayes classifiers. Classification based content verification is further described in U.S. patent application Ser. No. 14/702,363, filed on May 1, 2015, which is hereby incorporated by reference in its entirety.

A source 150 is a computing system capable of providing various types of content to the client device 110 and the digital content system 130. Examples of content provided by a source 150 include images, text, video, or audio on web pages, web feeds, social networking information, messages, or other suitable data. Additional examples of content include user-generated content such as blogs, tweets, shared images, video or audio, social networking posts, and social networking status updates. Content provided by a source 150 may be received from a publisher (e.g., stories about news events, product information, entertainment, or educational material) and distributed by the source 150, or a source 150 may be a publisher of content it generates. A content item may include various types of content, such as images, text, and video.

The digital content system 130 enables users to access, view and interact with digital content items in a safe, efficient and enjoyable online environment provided by the content system 130. To keep safe the content items provided by the digital content system 130 to consume, the digital content system 130 applies a content policy to its content items. To comply with the content policy, the digital content system 130 identifies image content items that are suspicious of containing unsafe content and provides the suspiciously unsafe image content items to the verification server 140 for verification. Based on the verification results, the digital content system 130 is configured to take remedial actions on the unsafe image content items, e.g., manual review by a human reviewer, blocking the content item from being distributed to other users and reporting child exploitation images to appropriate government authorities.

In the embodiment illustrated in FIG. 1, the digital content system 130 includes a content store 131, a safe content store 132, an application server 133, a content server 134, an image analyzer 135 and a policy module 136. In alternative configurations, different and/or additional components may be included in digital content system 130.

The content store 131 stores objects that represent various types of digital content items such as images, text and videos. Each content item may have one or more attributes associated with the content item, e.g., an identifier, source of the content item, type of the content item, time the content item was received by the digital content system 130, user interactions with the content item. For example, the content store 131 stores content items received from one or more sources 150 within a threshold time of a current time, e.g., 6 months. Examples of content items stored by the content store 131 include photographs, page posts, status updates, videos, links, news articles, audios, check-in events at locations, or any other types of content. Upon a user request for a content item received by the digital content system 130, the content server 134 searches the content store 131 for the requested content item.

The safe content store 132 stores a portion of the content items received by the digital content system 130, and each content item stored in the store 132 has been determined to be safe by the digital content system 130. In one embodiment, a content item is deemed to be safe based on one or more criteria. One of the criteria is the source of a content item. A content item provided by a source known for providing safe content, such as CNN®, is determined to be safe. Another criterion is whether the content item matches a content item that has already been checked to be safe. Yet another criterion is whether the content item contains less than a threshold amount of human skin. Determining whether a content item is safe is further described below with reference to the image analyzer 135 and FIG. 2-FIG. 5.

The application server 133 is a computer server that receives user requests for content items and provides the requested content items to the user in response to the user requests. In one embodiment, the application server 133 is a digital magazine server that receives content items from the content server 134, generates pages in a digital magazine by processing the received content, and provides the pages to the user of the client device 110 or provides instructions to the client device 110 to generate pages in a digital magazine. For example, the application server 133 determines a page layout by specifying positioning of content items relative to each other based on information associated with a user and generates a page including the content items arranged according to the determined layout for presentation to the user via the client device 110. The application server 133 allows the user to access content items via the client device 110 in a format that enhances the user's interaction with and consumption of the content items.

Upon receiving a user request for a content item, the application server 133 communicates with the content server 134 regarding the requested content item. The content server 134 is a computer server that retrieves content items requested by a user. In one embodiment, the content server 134 retrieves the requested content item from the content store 131 or from a source 150 if the requested content item is not stored in the content store 131. For each retrieved content item, the content server 134 checks the type of the retrieved content item. If the requested content item is an image content item, the content server 134 provides the content item and its corresponding attributes, e.g., source, time of the retrieval, to the image analyzer 135 for further analysis.

In one embodiment, the content server 134 can have a textual content analyzer (not shown in FIG. 1) that analyzes textual content in a content item to identify inappropriate content in the content item, e.g., offensive language or profanity. For example, the textual content analyzer extracts text signals from the textual content and applies a trained textual content analysis model to the extracted text signals. Based on the application of the trained textual content analysis model, the textual content analyzer identifies offensive language or profanity text in the content item. Examples of textual content analysis include classification based analysis such as the embodiments described in U.S. patent application Ser. No. 14/702,363, filed on May 1, 2015, which is hereby incorporated by reference in its entirety.

The image analyzer 135 pre-filters an image content item received from the content server 134 and determines whether the image content item is suspicious of containing unsafe content. In one embodiment, the image analyzer 135 pre-filters an image content item based on the source of the image content item. If the image content item is from a source known to provide safe image content items, e.g., CNN® and National Geography, the image analyzer 135 determines that the image content item is not suspicious of containing unsafe content.

In another embodiment, the image analyzer 135 pre-filters an image content item by comparing the image content item with the safe image content items stored in the safe content store 132. If the image content item matches any image content item stored in the safe content store 132, the image analyzer 135 determines that the image content item has safe content. Any image comparison schemes known to those of ordinary skill in the art can be used by the image analyzer 135 for the comparison.

Figure 2:
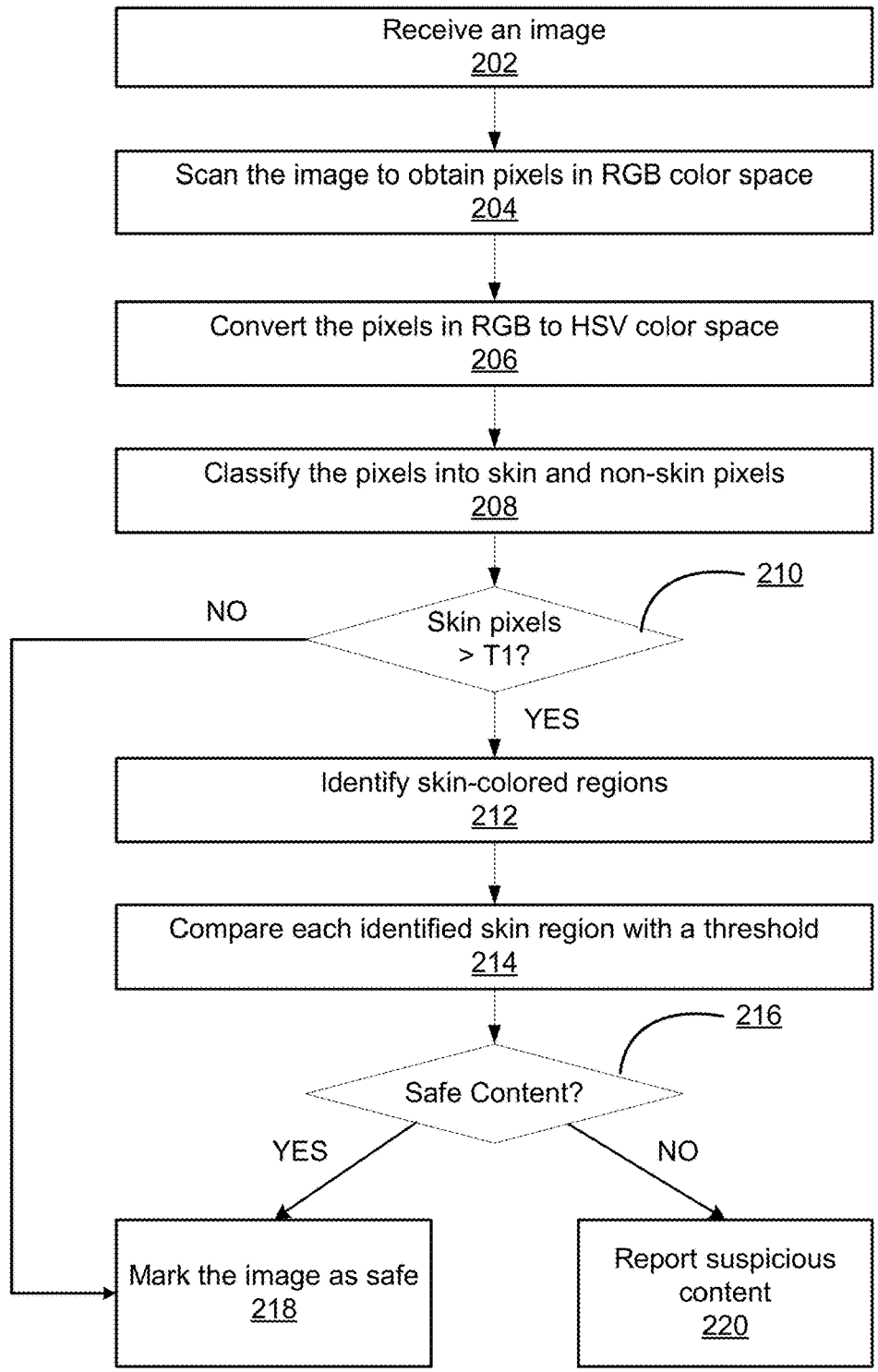
FIG. 2 is a flow chart of a method for determining whether an image content item is suspicious of containing unsafe content according to one embodiment.

In yet another embodiment, the image analyzer 135 pre-filters an image content item based on analysis of the image in the image content item. Referring now to FIG. 2, FIG. 2 is a flow chart of a method for analyzing an image content item by the image analyzer 135 according to one embodiment. Initially, the image analyzer 135 receives 202 the image of the image content item and scans 204 the image to obtain pixels of the image in a red-green-blue (RGB) color space. To organize the colors of the pixels of the image in terms of hue, lightness and chroma, the image analyzer 135 converts 206 the pixels in the RGB color space to the pixels in hue, saturation and value (HSV) color space. Any RGB-to-HSV conversion schemes known to those of ordinary skill in the art, e.g., nonlinear transformation, can be used by the image analyzer 135 for the conversion.

The image analyzer 135 classifies 208 the pixels into skin and non-skin pixels. In one embodiment, the image analyzer 135 applies a trained skin detection classifier to the pixels and labels a pixel either as a skin pixel or non-skin pixel based on the application of the classifier. It is noted that the human skin color has a restricted range of hues and is not deeply saturated because the appearance of skin is formed by a combination of blood (red) and melanin (brown, yellow). Therefore, the human skin color is known to not fall randomly in a given color space, but clustered at a small area in the color space. An example of the trained skin detection classifier is further described in U.S. patent application Ser. No. 14/702,363, filed on May 1, 2015, which is hereby incorporated by reference in its entirety. In other embodiments, more advanced heuristics, such as skin tone range detection, skin tone location, skin pixel, and connected skin regions are also utilized, in combination with determining whether the image depicts a human being and not a non-human object.

Based on the pixel classification, the image analyzer 135 calculates the total number of pixels that are classified as skin pixels. In one embodiment, the image analyzer 135 compares 210 the total number of skin pixels with a threshold value. Responsive to the total number skin pixels in the image not exceeding the threshold value, the image analyzer 135 determines that the image is not suspicious of containing unsafe content, e.g., nudity, and marks 218 the image as safe.

On the other hand, responsive to the total number skin pixels in the image exceeding the threshold value, the image analyzer 135 performs further analysis on the image. In one embodiment, the image analyzer 135 identifies 212 skin-colored regions, e.g., face region, body region, by identifying connected regions in the image, whose pixels are consistent with human skin tones. The image analyzer 135 clusters and sorts the identified skin-colored regions. For example, for each identified skin-colored region, the image analyzer 135 compares 214 the number of skin pixels included in the identified region with a threshold. Based on the analysis of the identified skin-colored regions, the image analyzer 135 determines 216 that the image is safe or not. For example, if a total of number of skin-colored regions is larger than a first threshold and a total of number of the skin pixels in the identified skin-colored regions is larger than a second threshold, the image analyzer 135 determines 216 that the image is suspicious of containing unsafe content, e.g., nudity, and reports 220 the determination along with the image to the policy module 136 for further processing.

Figure 3:
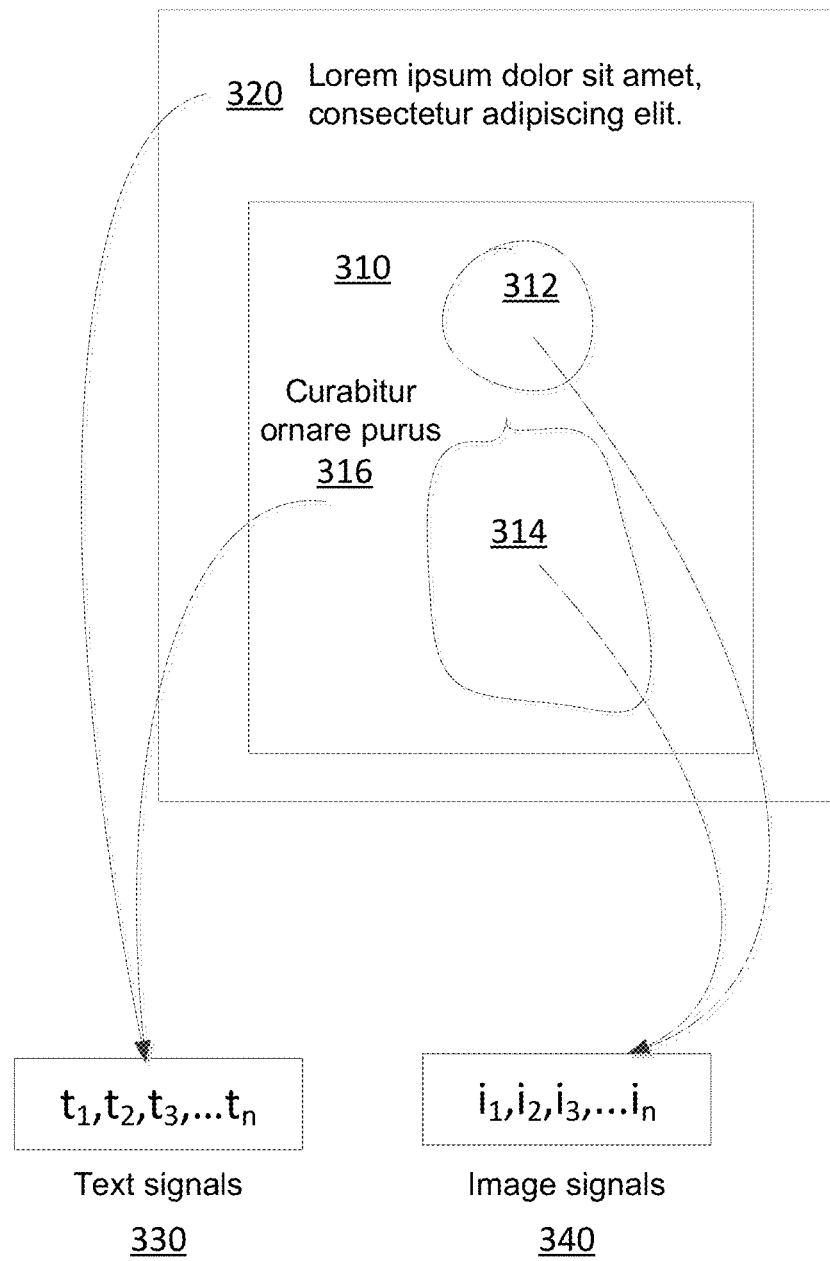
FIG. 3 illustrates an example content item that is analyzed by the digital content system shown in FIG. 1.

Turning now to FIG. 3, FIG. 3 illustrates an example content item 300 that is analyzed by the digital content system 130 according to one embodiment. In the example shown in FIG. 3, the content item 300 includes text 320 and text 316 and an image 310. The text signals 330 are extracted from the text 320 and 316 and analyzed, e.g., by the textual content analyzer of the content server 134, to detect inappropriate text in the content item 300. The image analyzer 135 analyzes the image 310 to detect unsafe image content.

In one embodiment, the image analyzer 135 extracts image pixels that represent the image signals 340 of the image 310. In response to the image pixels being in RGB color space, the image analyzer 135 extracts the image pixels in the RGB color space and converts the image pixels into HSV color space. The image analyzer 135 classifies the image pixels into skin pixels and non-skin pixels. If the total number of the skin pixels is greater than a predetermined threshold, the image analyzer 135 identifies skin-colored regions, e.g., region 312 representing a detected human face and region 314 representing a detected human body. Based on the analysis of the identified skin-colored regions, the image analyzer 135 determines that the image is not safe.

Referring back to FIG. 1, in the embodiment shown in FIG. 1, the digital content system 130 also includes a policy module 130, which is configured to enforce a content policy of the digital content system 130. In one embodiment, the content policy includes one or more rules applied to content items containing unsafe content and remedial actions on such content items. For example, for any image content item that is suspicious of containing unsafe content, the content policy requires such suspicious image content item to be further verified by the verification server 140. Upon the verification from the verification server 140 indicating that the image content item indeed contains unsafe content, the content policy requires one or more remedial actions, e.g., preventing the image content item from being further distributed, shutting down user accounts associated with the distribution of such image content item, reporting the detection to appropriate legal authorities, e.g., the U.S. National Center for Missing and Exploited Children.

Figure 4:
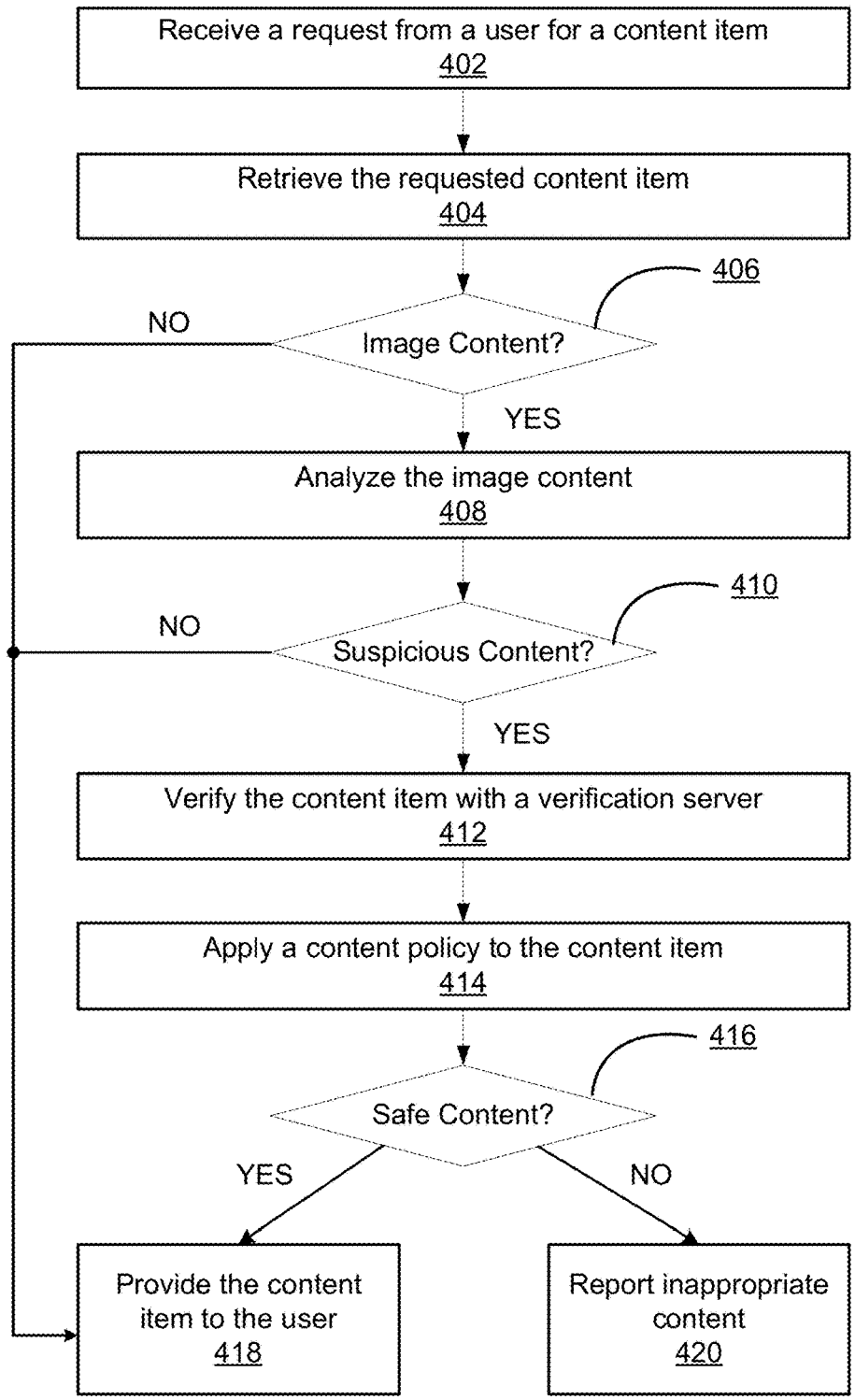
FIG. 4 is a flow chart of a method for filtering image content items according to one embodiment.

FIG. 4 is a flow chart of a method for filtering image content items according to one embodiment. Initially, the digital content system 130 receives 402 a request for a content item and retrieves 404 the requested content item from the content store 131 or a source 150. The digital content system 130 checks 406 the type of the requested content item. If the requested content item is an image content item, the content system 130 analyzes 408 the image content item to determine whether the image content item is suspicious of containing unsafe content, e.g., being analyzed by the image analyzer 135 illustrated in FIG. 2. Responsive to a determination that the image content item does not contain unsafe content, the content system 130 provides 418 the image content item to the user requesting the image content item. Responsive to a determination that the image content item is not suspicious of having unsafe content such as nudity or pornography, the content system 130 verifies 412 the image content item with a verification service, e.g., MICROSOFT™ PHOTODNA® service. In one embodiment, the content system 130 provides a pre-calculated bit string representation (e.g., a base64 string representation) of the suspicious image, instead of sending out direct URLs of the suspicious image, to Microsoft PHOTODNA® service for verification. Sending a pre-calculated bit string representation of a suspicious image not only prevents important usage information from exposing to a third-party service, but also saves the third-party effort in fetching content stored in a remote storage location, thus reducing service roundtrip time. The content system 130 applies 414 a content policy to the content item based on the verification result. For example, if the verification result indicates that the image content item indeed contains unsafe content such as child exploitation images, the content system 130 determines 416 that the content items is not safe to be further distributed and takes a remedial action, e.g., reports 420 the inappropriate content to an appropriate legal authority and stores the inappropriate content and related information in a permanent storage medium for archiving purpose.

Figure 5:
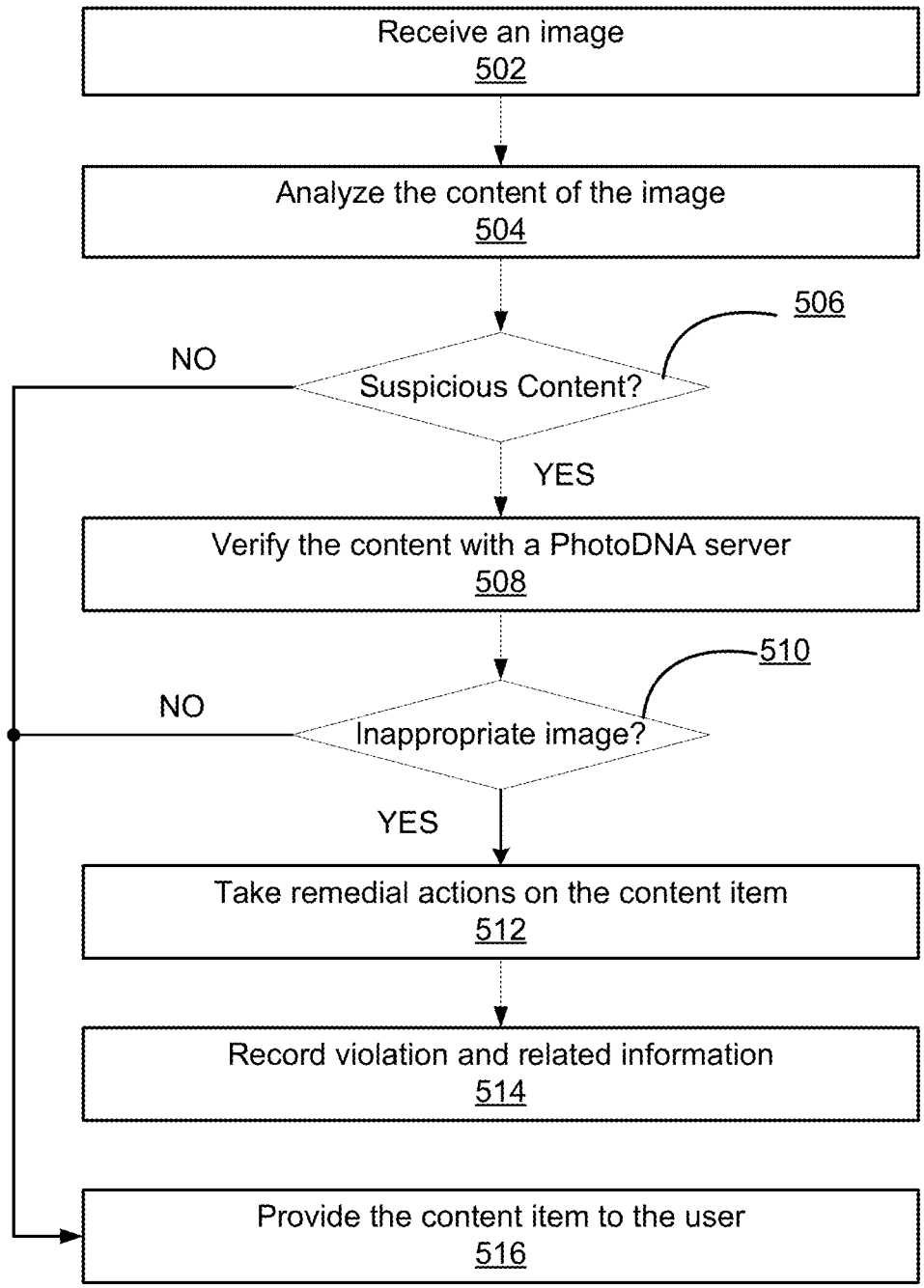
FIG. 5 is a flow chart of verifying an image content item that is determined to be suspicious of containing unsafe content with a third-party verification service according to one embodiment.

In response to an image content being determined to be suspicious of containing unsafe content, the content system 130 may further verify the determination with a verification server. FIG. 5 is a flow chart of verifying an image content item with a third-party verification service according to one embodiment. The content system 130 receives 502 an image and analyzes 504 the content of the image. If the content of the image is determined 506 to be suspicious of being unsafe, the content system 130 provides the suspicious image, e.g., a URL of the suspicious image or a bit string representation (e.g., a base64 string representation) of the suspicious image, to a PHOTODNA® server, which verifies the 508 the content of the suspicious image. For example, the PHOTODNA® server computes a hash of the suspicious image, where the hash represents a unique digital signature of the suspicious image. The PHOTODNA® server compares the hash of the suspicious image with references hashes, each of which corresponds to a reference image that has been verified by the PHOTODNA® server. Responsive to a match between the signature of the suspicious image with a signature of a reference image, the PHOTODNA® server determines that the suspicious image indeed contains inappropriate image content, e.g., child pornography, and reports the verification finding to the content system 130. The content system 130 takes 512 one or more remedial actions on the suspicious image, e.g., taking down the image from the content system 130. The content system 130 also records 514 a violation related to the suspicious image and related information, e.g., the source of the suspicious image, in a permanent storage medium for archiving purpose. If the image is safe to consume, the content system 130 provides 516 the image to the user for consumption Pre-filtering image content items and verifying identified suspicious image content items by the digital content system 130 advantageously enables users to access, view and interact with digital content items in a safe, efficient and enjoyable online environment provided by the content system 130. Additionally, pre-filtering image content items and verifying identified suspicious image content items enables the digital content system 130 to work with other digital content platforms, e.g., TWITTER', to prevent the dissemination of inappropriate or illegal digital content in online digital content sharing and social networking systems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for identifying content items that violate a content policy of a digital content system, the method comprising:

receiving a request from a user for content items to the digital content system; identifying, by the digital content system in response to receiving the request, a content item based on interests of the user maintained by the digital content system, the content item comprising at least one digital image;

extracting image signals from the digital image of the content item;

analyzing the extracted image signals at the digital content system by: classifying pixels representing the digital image as skin pixels or non-skin pixels based on the extracted image signals, determining a total number of skin pixels in the digital image, identifying connected regions including skin pixels in the digital image from the classifying, and determining a number of skin pixels in each of the identified connected regions;

determining whether the content item is suspicious of containing unsafe or illegal content based on the analysis of the extracted image signals by comparing a number of identified connected regions including skin pixels to a threshold and comparing the number of skin pixels in each of the identified connected regions to an additional threshold;

responsive to a determination that the content item is suspicious of containing unsafe or illegal content, sending a bit string representation of the content item to a verification service external to the digital content system;

responsive to receiving, at the digital content system, a verification that the content item contains unsafe or illegal content from the verification service external to the digital content system, taking an action by the digital content system, wherein the action comprises shutting down user accounts maintained by the digital content system and associated with distribution of the content item; and responsive to receiving, at the digital content system, an indication that the content item does not contain unsafe or illegal content from the verification service external to the digital content system, generating a page of a digital magazine including the content item and providing the generated page of the digital magazine to a client device associated with the user for display, the client device configured to allow the user to interact with the content item.

2. The method of claim 1, wherein extracting the image signals from the digital image comprises:

extracting pixels of the digital image in a red-green-blue (RGB) color space; and converting the pixels in the RGB color space to corresponding pixels in hue-saturation-value (HSV) color space.

3. The method of claim 1, wherein a pixel of the extracted image signals is classified as a skin pixel responsive to the pixel having a color within a predefined range that is consistent with human skin tones.

4. The method of claim 1, further comprising:

determining whether the content item is suspicious of containing unsafe content based on source of the content item; and responsive to the source of the content item being known to provide safe content items, determining that the content item is safe to be consumed by users of the digital content system.

5. The method of claim 1, further comprising:

determining whether the content item is suspicious of containing unsafe content based on a comparison of the content item with each of a plurality of reference content items, each reference content item being known to be safe to be consumed by users of the digital content system; and responsive to a match between the content item and a reference content item, determining that the content item is safe to be consumed by the users of the digital content system.

6. The method of claim 1, wherein the verification service is configured to:

compute a unique digital signature of the digital image of the content item;

compare the unique digital signature of the digital image of the content item with a plurality of reference digital signatures, each reference digital signature representing a reference digital image that is known to be unsafe; and responsive to a match between the unique digital signature of the digital image and a reference digital signature, identify the digital image of the content item as unsafe.

7. The method of claim 1, wherein a content item is unsafe if the content item contains at least one of offensive language, profanity, nudity, pornography and child exploitation images.

8. A non-transitory computer-readable storage medium storing executable computer program instructions for identifying content items that violate a content policy of a digital content system, the computer program instructions when executed by a computer processor cause the computer processor to:

receiving a request from a user for content items to the digital content system; identifying, by the digital content system in response to receiving the request, a content item based on interests of the user maintained by the digital content system, the content item comprising at least one digital image;

extracting image signals from the digital image of the content item;

analyzing the extracted image signals at the digital content system by: classifying pixels representing the digital image as skin pixels or non-skin pixels based on the extracted image signals, determining a total number of skin pixels in the digital image, identifying connected regions including skin pixels in the digital image from the classifying, and determining a number of skin pixels in each of the identified connected regions;

determining whether the content item is suspicious of containing unsafe or illegal content based on the analysis of the extracted image signals by comparing a number of identified connected regions including skin pixels to a threshold and comparing the number of skin pixels in each of the identified connected regions to an additional threshold;

responsive to a determination that the content item is suspicious of containing unsafe or illegal content, sending a bit string representation of the content item to a verification service external to the digital content system;

responsive to receiving, at the digital content system, a verification that the content item contains unsafe or illegal content from the verification service external to the digital content system, taking an action by the digital content system, wherein the action comprises shutting down user accounts maintained by the digital content system and associated with distribution of the content item; and responsive to receiving, at the digital content system, an indication that the content item does not contain unsafe or illegal content from the verification service external to the digital content system, generating a page of a digital magazine including the content item and providing the generated page of the digital magazine to a client device associated with the user for display, the client device configured to allow the user to interact with the content item.

9. The computer-readable storage medium of claim 8, wherein extracting the image signals from the digital image comprises:

extracting pixels of the digital image in a red-green-blue (RGB) color space; and converting the pixels in the RGB color space to corresponding pixels in hue-saturation-value (HSV) color space.

10. The computer-readable storage medium of claim 8, wherein a pixel of the extracted image signals is classified as a skin pixel responsive to the pixel having a color within a predefined range that is consistent with human skin tones.

11. The computer-readable storage medium of claim 8, further comprising computer program instructions that, when executed by the computer processor, cause the computer processor to:

determine whether the content item is suspicious of containing unsafe content based on source of the content item; and responsive to the source of the content item being known to provide safe content items, determine that the content item is safe to be consumed by users of the digital content system.

12. The computer-readable storage medium of claim 8, further comprising computer program instructions, when executed by the computer processor, cause the computer processor to:

determine whether the content item is suspicious of containing unsafe content based on a compassion of the content item with each of a plurality of reference content items, each reference content item being known to be safe to be consumed by users of the digital content system; and responsive to a match between the content item and a reference content item, determine that the content item is safe to be consumed by the users of the digital content system.

13. The computer-readable storage medium of claim 8, wherein the verification service is configured to:

compute a unique digital signature of the digital image of the content item;

compare the unique digital signature of the digital image of the content item with a plurality of reference digital signatures, each reference digital signature representing a reference digital image that is known to be unsafe; and responsive to a match between the unique digital signature of the digital image and a reference digital signature, identify the digital image of the content item as unsafe.

14. The computer-readable storage medium of claim 8, wherein a content item is unsafe if the content item contains at least one of offensive language, profanity, nudity, pornography and child exploitation images.

* * * * *

UNITED STATES PATENT AND TRADEMARK OFFICE
CERTIFICATE OF CORRECTION

PATENT NO. : 9,967,266 B2
APPLICATION NO. : 14/935770
DATED : May 8, 2018
INVENTOR(S) : Mengo Guo and David Zachary Creemer Page 1 of 1

It is certified that error appears in the above-identified patent and that said Letters Patent is hereby corrected as shown below:

Column 11, Lines 21-22, Claim 8, delete "processor to: receiving" and insert --process to: receive--.

Column 11, Line 28, Claim 8, delete "extracting image" and insert --extract image--.

Column 11, Line 30, Claim 8, delete "analyzing the extracted image" and insert --analyze the extracted image--.

Column 11, Line 38, Claim 8, delete "determining whether" and insert --determine whether--.

Column 11, Lines 46-47, Claim 8, delete "content, sending a bit" and insert --content, send a bit--.

Column 11, Line 53, Claim 8, delete "system, taking an action" and insert --system, take an action--.

Column 11, Line 61, Claim 8, delete "system, generating a page" and insert --system, generate a page--.

Signed and Sealed this
First Day of January, 2019

Andrei Iancu
*Director of the United States Patent and Trademark Office*